US007904886B2

(12) United States Patent
Dufour et al.

(10) Patent No.: US 7,904,886 B2
(45) Date of Patent: Mar. 8, 2011

(54) METHOD FOR EXECUTING AN APPLICATION IN A VIRTUAL CONTAINER FORMING A VIRTUALIZED ENVIRONMENT SESSION

(75) Inventors: Laurent Dufour, Toulouse (FR); Cedric Le Goater, Toulouse (FR); Marc Philippe Vertes, Saint-Lys (FR)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 11/374,362

(22) Filed: Mar. 13, 2006

(65) Prior Publication Data

US 2007/0234295 A1  Oct. 4, 2007

(51) Int. Cl.
*G06F 9/44* (2006.01)
(52) U.S. Cl. .......................... 717/124; 717/107; 717/111
(58) Field of Classification Search ........................ None
See application file for complete search history.

(56) References Cited

U.S. PATENT DOCUMENTS

| | | | | |
|---|---|---|---|---|
| 5,369,770 A | * | 11/1994 | Thomason et al. | 710/260 |
| 5,437,006 A | * | 7/1995 | Turski | 715/209 |
| 5,832,270 A | * | 11/1998 | Laffra et al. | 717/125 |
| 5,987,463 A | * | 11/1999 | Draaijer et al. | 1/1 |
| 6,118,447 A | * | 9/2000 | Harel | 717/131 |
| 6,249,907 B1 | * | 6/2001 | Carter et al. | 717/129 |
| 7,415,705 B2 | * | 8/2008 | DeWitt et al. | 717/168 |
| 7,472,384 B1 | * | 12/2008 | Beloussov et al. | 717/168 |
| 2002/0062389 A1 | * | 5/2002 | Vertes | 709/238 |
| 2002/0112058 A1 | * | 8/2002 | Weisman et al. | 709/227 |
| 2003/0233636 A1 | * | 12/2003 | Crawford | 717/130 |
| 2005/0251785 A1 | * | 11/2005 | Vertes et al. | 717/105 |

FOREIGN PATENT DOCUMENTS

WO    WO 2004015574 A2 *  2/2004

* cited by examiner

*Primary Examiner* — Tuan Q Dam
*Assistant Examiner* — Zheng Wei
(74) *Attorney, Agent, or Firm* — Yee & Associates, P.C.; Matthew W. Baca

(57) ABSTRACT

This invention relates to a method for dynamic insertion of a computer code processing within a running computer task in a transparent fashion for this target task. It also relates to a method using such a dynamic insertion in order to execute a multi-task application in a virtual container forming a virtualized environment session. This method comprises the following steps of storing by a manager task of a hooking datum representing the code processing to be inserted; executing, within the execution of a system routine called by the target task, a hooking instruction initiating a test of the hooking datum; and executing the inserted code, according to the result of said test and instead of the program instruction following the hooking instruction in the execution of said system routine.

16 Claims, 4 Drawing Sheets

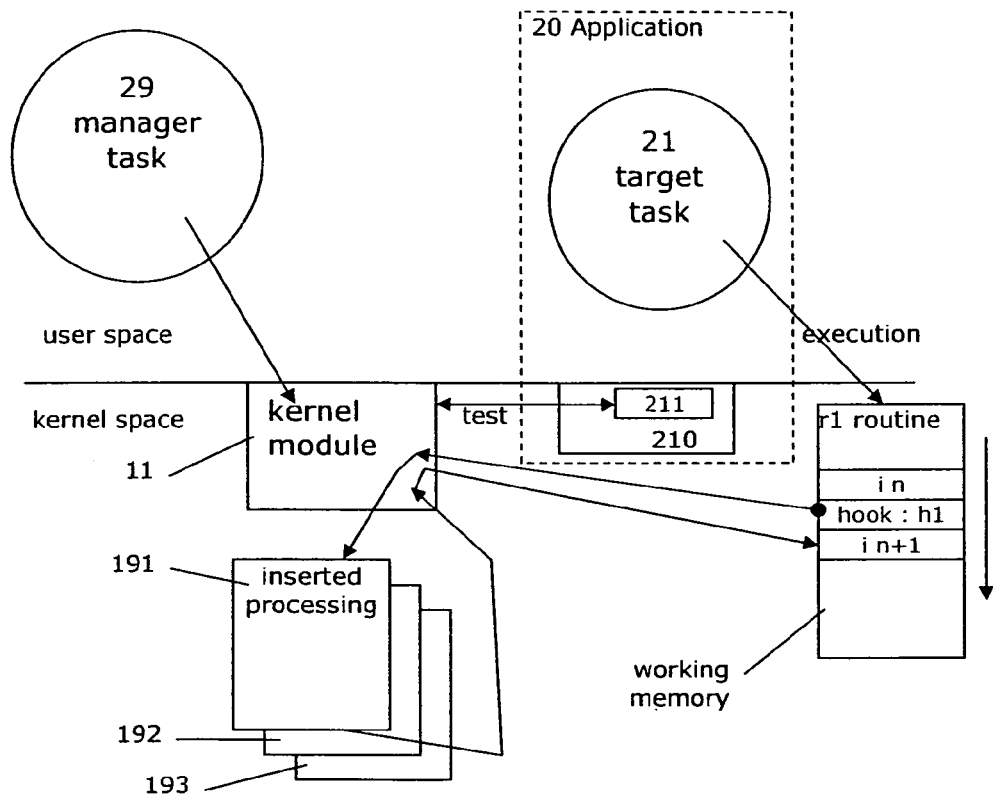
FIG.1A
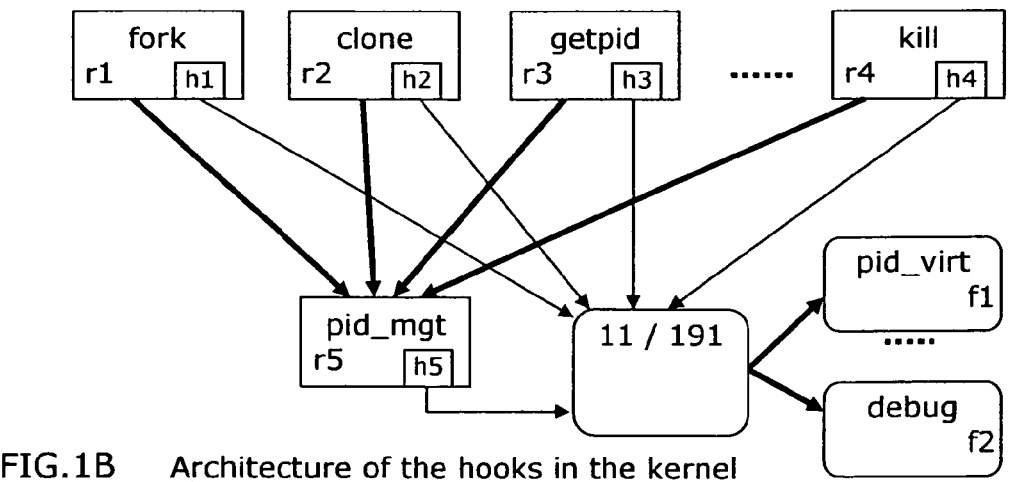
FIG.1B   Architecture of the hooks in the kernel process memory address space

METHOD FOR EXECUTING AN APPLICATION IN A VIRTUAL CONTAINER FORMING A VIRTUALIZED ENVIRONMENT SESSION

FIELD OF THE INVENTION

This invention relates to a method for dynamic insertion of a computer process within a computer task undergoing execution in a transparent fashion for this task. It also relates to a method using such a dynamic insertion in order to execute an application in a virtual container forming a virtualized environment session.

Within a computer or a network of computers, these methods are useful in particular for managing the way in which some computer applications are executed, even if they are not designed with a view to such management.

The field of the invention is that of networks or clusters of computers formed from a number of computers working together. These clusters are used to execute software applications bringing one or more services to users. These applications can be single or multi-process, and be executed on a single computer or distributed over a number of networked computers working together in order to form a "cluster". These can be in particular transactional applications, for example in the form of a distributed application, and communicating by exchange of messages ("Message Passing Interface") or through shared memory areas ("Shared Memory").

The invention applies particularly to operational management, within the computer or cluster, of such an application termed master or primary and executed on a computer termed primary or operational node. This operational management can in particular be implemented by another software application termed intermediate application, for example an application of the "middleware" type. This operational management can comprise in particular the operations of replication, redistribution, reliability management, or tracking ("debugging") of all or part of this application, within the primary node or in collaboration with other nodes termed secondary.

BACKGROUND ART

In order to implement such an operational management, it is useful to be able to intervene in the execution of the managed application, for example in order to analyse or modify its functioning. It is in particular useful to have techniques available for recording events occurring within this application, in order to be able to replay them, i.e. re-execute them or cause them to be produced in the same fashion, at another moment or on another node or computer.

Now, if an application used in operation has not been designed from the start to produce such a management, it is difficult and costly to add such functions to it later, and this is a significant risk of errors. For all existing applications, it is particularly useful to be able to implement such an operational management without editing their executable files, and at the same time keeping them in their original version ("legacy applications").

Methods already exist which allow the dynamic loading of code into an executable, which constitutes a critical element of the method. We list them below, and indicate some of their limitations.

Pre-loading of a library by the dynamic link editor. During the execution of an executable for editing dynamic links, it is possible to preload, by the specification of an environment variable, a library not required in the addressable memory space of the program. In particular, this method is not applied to executables for editing a static link.

Loading a library by using the existing system call "ptrace" from a third party process. This method is that used by debuggers in order to alter the execution of a process. It is based on the presence of debug symbols in the binary of the executable in order to allow the invocation of functions. The library loading function, termed "dlopen" in Linux, must already be present in the executable, which is not always the case (and rare in the case of static executables).

These methods, as well as the limitations which they include for the insertion of code into processes during execution, do not alone guarantee correct functioning of the executable if the code inserted must be deleted later.

Such methods often resort to considering that the code parts thus inserted are done so permanently, which then poses potential problems of interference between the inserted code and the original executable.

Certain methods of dynamic interposition are also described in patent no. FR 2 843 210 by the same inventors, but allow above all intervening during the execution of a system call. These techniques can be insufficient to intervene in instructions not producing a system call.

SUMMARY OF THE INVENTION

One purpose of the invention is to overcome some of the drawbacks of the prior art, and in particular to allow the insertion of a computer process within the execution of a task belonging to such an application.

In this spirit, the invention proposes a method for dynamic insertion of one or more program instructions, constituting or launching an inserted code processing, by a first computer task, termed manager task, in a second computer task, termed target task, executed in a memory address space managed by a system software in a computer system, this method comprising the following steps:

a storage, within a memory area outside the working memory or memory address space of the target task, of at least one hooking datum representing initiation data for the code processing to be inserted;

an execution, within the execution of a system routine called or controlled by the target task, of an instruction termed hooking which initiates a test of the hooking datum;

execution of the inserted code, according to the result of said test and instead of the program instruction following the hooking instruction in the execution of said system routine.

In particular, on completion of the execution of the inserted code, the execution of the system routine resumes where it was interrupted for executing the inserted code, i.e. with the program instruction immediately following the hooking instruction.

In the case where the target task is linked to at least one other task, termed linked, by the sharing of a single execution memory space or a single memory address space, the method also comprises a temporary blocking of the linked task during at least one operation comprising the loading, into said memory space, of instructions of the code to be inserted.

Advantageously, the inserted code processing comprises a management of at least one datum identifying the target task.

More particularly, the inserted code processing carries out or initiates at least one functioning management operation of an application termed managed application.

This functioning management operation may comprise at least one operation of monitoring or recording of the execution of the target task, or of capturing the state of said target task or of at least one resource which it uses.

In particular, this functioning management operation comprises at least one operation for storing a datum associated with the target task and representing a synchronization barrier with at least one other task.

More particularly, this functioning management operation comprises at least one operation of replication of the target task into another computer system, or of releasing said target task or at least one resource which uses its resources, in its original system, after such a replication.

The inserted process may also produce a dynamic loading of an element of a software library, said software library being accessible or editable during the execution of the target task or of an application to which it belongs.

The inserted process may also comprise a storage, in an associated fashion with the target task, of a datum constituting a common virtual identifier between the target task and at least one other running task, thus constituting an identifier of a virtual container encompassing said tasks.

The virtual container identifier may be stored in an associated fashion with a first task, by an inserted processing executed during a system routine called by said first task, this container identifier being propagated to at least one second task by inheritance from the first task.

This virtual container identifier may also be propagated by the characteristic that at least a third task is created by an operation comprising a hooking instruction used by a manager task in order to store with said third task a container identifier corresponding to an existing virtual container and which must contain said third task.

The invention may comprise at least one software operation being applied to all the task belonging to a single virtual container.

The virtual container may combine a set of task executed within a single application termed target application It may also be used for managing the functioning of at least one task executed in the computer system in an operation depending on its belonging to the virtual container.

According to one particular feature, the functioning management of the container tasks comprises a monitoring or checking of the execution or a capture of the state of at least one computer task or of at least one resource which it uses.

According to another particular feature, the functioning management of the container tasks comprises a replicating at least one computer task into another computer system, or releasing this task or at least one resource which it uses, after such a replication.

BRIEF DESCRIPTION OF THE DRAWINGS

Other features and advantages of the invention will become apparent from the detailed description of one embodiment, which is in no way limitative, and the appended drawings, where:

FIG. 1A illustrates inserting a code processing into execution of a target task;

FIG. 1B illustrates use of hooking instructions in system routines, for implementing extra code processing;

DETAILED DESCRIPTION OF THE PREFERRED EMBODIMENT

Bootstrap Mechanism

Figure 1C:
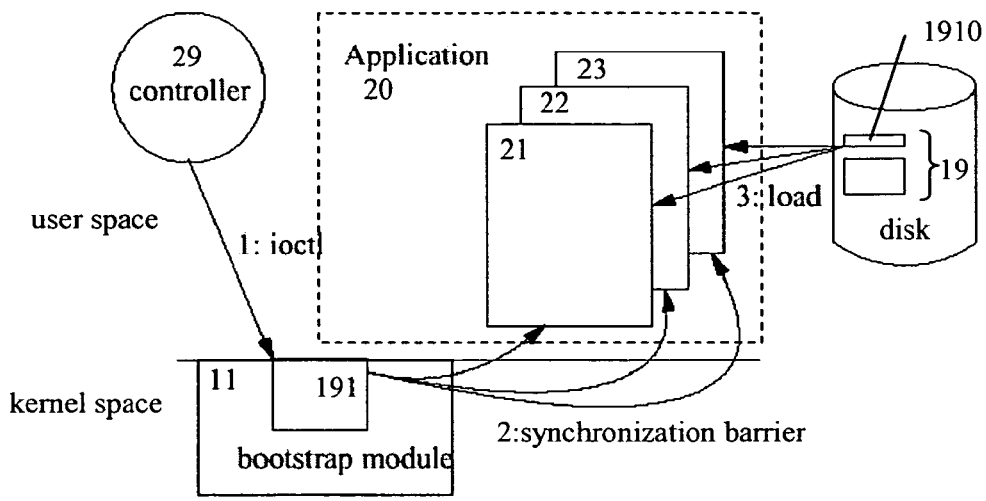
FIG. 1C illustrates some steps of using an inserted code for initiating extra processing.

This description presents a method for dynamic, temporary and reversible mutation, of the process binary code during execution. This method is used, inter alia, to implement the capture (checkpoint) of the state of running applications without having to modify them.

In summary, this is, inter alia, a bootstrapping problem: we are describing a method of loading a single module 191 (the bootstrap module), which will itself be able to load and then execut complex libraries 1910 in the target process or application.

Another way of obtaining this function for a given application, would be that the program for this application has in itself functionalities from the management of its own internal memory, in particular executable code parts, which requires either that the program should have access to a library of such functions (which is not the case for static programs), or that the program should have been originally designed for this, or that the program should be redesigned or recompiled.

An important objective of the method presented is to be able to apply this insertion method, as well as a given inserted function (such as the checkpoint), to all existing programs, without modification or redesign.

The characteristics of the new method are:

Compatibility with static or dynamic executables.

Does not depend on the presence of debug symbols in the executable.

Does not depend on the presence in the executable of dynamic loading functions for binary objects.

Capacity for instrumentation of executables under the control of "ptrace".

Short life cycle. Complete reversibility. The extra code is loaded not at the start of the process, but just before the operation to be carried out (checkpointing for example). At the end of the operation, all the newly inserted code inserted is unloaded.

Taking into account several competing and simultaneous tasks, whether sharing or not the same memory addressing space (as for threads opposed to processes).

In the instrumentation process, we are interested in the first step, which comprises loading into an executable a library of functions the presence of which is not initially required by the executable. Such a library may contain code enabling, for example "profiling" (fine grain performance measurement), or the activation of diagnostic traces, or even the capture of process states, inter alia for the purposes of high availability or of application migration between machines belonging to a cluster.

The mutation method described here, in order to be reversible, and to preserve the existing code of target programs, comprises adding new code segments into the addressable memory space of the program. This addition, the running of this code, as well as its deletion, are controlled by a third party process 29 outside the application.

The principle of this method consists of implementing the library loading service in the operating system. The service itself is provided by a dynamic loading kernel module 11. This service may be initiated via an input-output system call (ioctl) over a peripheral driver (device driver) provided by the kernel. It can also be initiated in an automatic manner by hooking to the exec system call, in order to be propagated automatically.

In the preamble to the detailed description of the loading method, we describe the modification made to the operating system in order to implement the method.

Figure 1D:
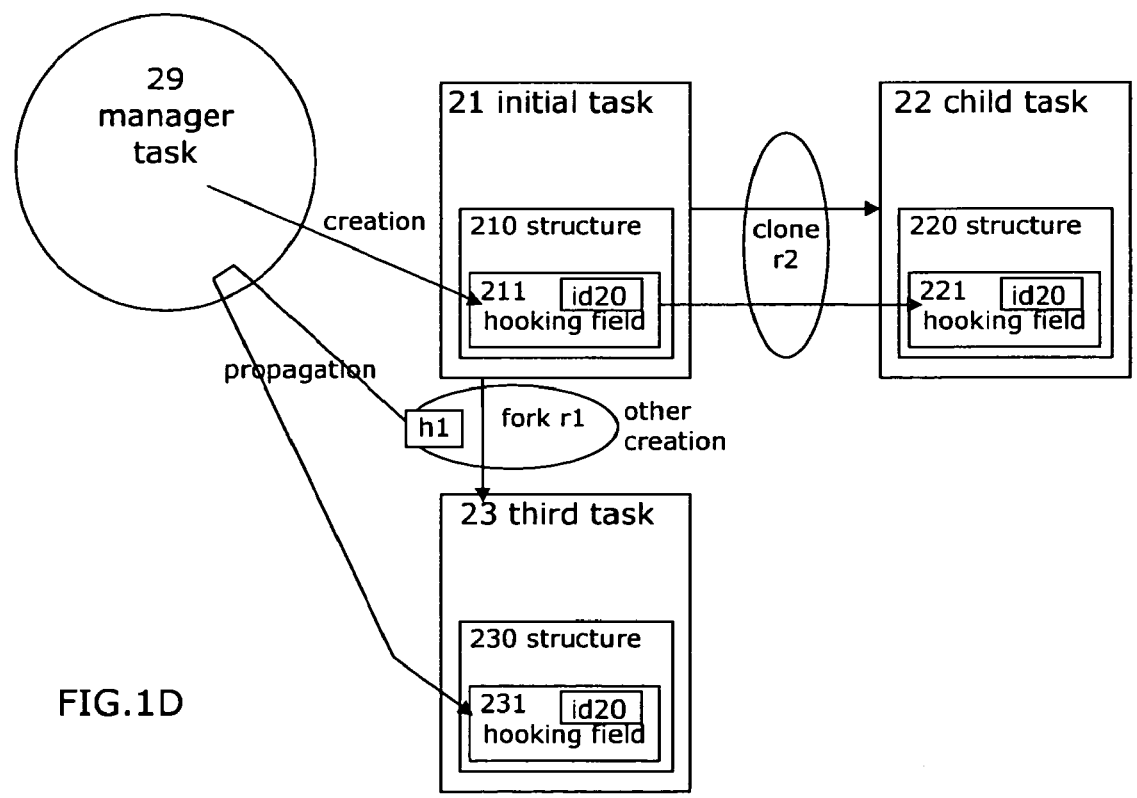
FIG. 1D illustrates creation and propagation of a hooking field within target tasks.

These modifications comprises, on the one hand, as illustrated in FIG. 1D, adding a particular field (hooking field 211) in the data structure 210 describing a task 1 at operating system level ("task_struct" structure in linux).

As illustrated in FIG. 1A and FIG. 1B, these modifications also comprises the insertion of "hooks" (h1 to h4) in the internal implementation of certain strategic system calls (r1 to r4) such as "fork", "exec", "getpid", "kill" etc. These hooks are conditional branching points enabling supplementary processing or functions to be triggered, from within the context of the system call, for example in order to implement virtualization tasks which we will be more detail hereafter. The triggering condition is associated to the value of the field 211 added in the "task_struct" structure 210.

One of the interests of the new "task_struct" field 211 is to be able to define, and at any instant identify, a set of tasks (thread ID or process ID), which we aggregate on the "session" or "virtual container" concept, and on which it is necessary to act in a consistent and simultaneous manner in order to maintain the coherence of the system.

Threads are example of entities which should belong to the same session, as several threads of a single process share the same addressable memory space. Loading of a module into one thread thus affects the others, which a cause of interdependence between several threads in a single process. Similarly, resources such as file descriptors are inherited during the creation of new tasks, and may create interdependence relationships between tasks 21 and 22 sharing a filiation.

The definition of a session s20 comprises assigning a unique session identifier (id20 FIG. 1D) to the initial task 21 of a target application 20 (for example, the launch shell script). This session number id20 will be propagated, by inheritance or through these hooks, to all the tasks 22 affiliated to this initial task, and to all the tasks 23 for which a new interdependence relationship appears (e.g.: transmission of a file descriptor between two non-affiliated processes 21 and 23).

The set up of the bootstrap loading module 11 is thus carried out for a whole list of given tasks, for example belonging to a session as described above.

Steps of the Library and Bootstrap Loading Method

The implementation procedure, in a Linux type environment, is illustrated in FIG. 1C and comprises:
1. Loading order by the controlling process 29, via a IOCTL (input/output control) system call to the bootstrap device driver 11.
2. For multi-thread processes (a number of competing tasks 21, 22 and 24 sharing the same memory space), a synchronization barrier implemented in the bootstrap module 191 enables the extra functions 1910 to be activated only once in each of these threads.
3. Insertion of the loading module 191 in the addressable memory space of the process 21. The module 191 is in two parts, a code segment 1911 compiled in a relocatable manner (i.e. all movements and jumps are calculated relative to the start of the segment), and a data segment 1912, by nature not relocatable (as the data constitute a non-executable memory segment).
4. A signal handler for the STOP signal is attached to the target process 21. This operation is implemented by the loader bootstrap module 11. As the STOP signal cannot be intercepted by the process 21 itself, there is no interference possible with other signal handlers. Upon receipt of a STOP signal by the target process 21, this handler initiates the execution of the loading module 191. The signal handler is parameterized so as to execute the input point of the text segment 1911 (thus executing the loading module 191 itself), by using as execution parameter the loading address of the data segment on emission of the signal, by the "SIGINFO" field.
5. A reference counter monitors the numbers of tasks having access to the loaded bootstrap module 191 after its loading at a given memory address. This can in particular check that no task is using the module 191, before its deletion or unloading.
6. Sending the STOP signal to the tasks 21, 22 and 24 belonging to the session. On receipt of the STOP signal, the following steps are taken:
7. Resolution of the relocation of data 1912 internal to the loaded bootstrap module 191, using the loading address of the code data segment 1911 passed as parameter (SIGINFO) on emission of the STOP signal. This is an extremely simplified treatment of the data symbols relocation phase. This makes the functioning of the loading module 191 independent of its position in the memory space of the target process 21.
8. An important function of the loaded bootstrap module 191 is to enable the loading, into the memory space of the session tasks, of the complex functional library 1910 (checkpoint/restart, performance measurement, or others).
9. Execution of the functional library 1910.
10. Removing of the code in two phases, with checking of the non-dependence of the tasks on the deleted code or in the order implied by possible dependencies of the tasks between each other: first all the functional library 1910, then the loaded bootstrap module 191 itself.

Ressource Virtualization for Functioning Management (Including Checkpointing and Restart)

For the replication or restoration of a restart application, from a master application, in another computer or in an environment different from that of the master application, there are certain techniques for the virtualization of the resources and of the original environment allowing the restart application to work as if it were still in its original environment.

The remainder of this description intends to detail and develop the description of application virtualization and replication methods in the "Holistic Replication" patent mentioned above.

Kernel Hooks and Sessions Defining

Another objective is to enable the virtualization of resources dependent on location, by the insertion of functions in the kernel implementation of certain system calls.

These arrangements consist, on the one hand, of adding a particular field in the data structure describing a task at operating system level ("task_struct" structure in linux).

As illustrated in FIG. 1A and FIG. 1B, these modifications also comprises the insertion of "hooks" (h1 to h5) which will be invoked during the execution in the kernel context of certain strategic system calls such as "fork", "exec", "getpid", "kill", etc. These hooks may be inserted into these system calls r1 to r4, or into a routine r5, for managing identifiers (PID or TID), which is itself called up by these system calls r1 to r4.

These hooks may also be inserted into an routine used by the system in order to manage a resource corresponding to the target task 21, even at moments when the latter does not involve a system call.

These hooks are conditional entry points inserted at the core of strategic routines, especially in the kernel, manipulating the resources to be virtualized (such as creation, deletion and identification of process-id). These routines are themselves called up by several system calls. The addition of a hook in these routines make it possible to carry out the virtualization of the pid in a simultaneous manner for all system calls using these routines.

The presence at a level of granularity finer than the system call also enables to extend the virtualization to operations which do not involve any system call, such as the triggering of an exception by the kernel, which is notified to the process in signal form.

The hook itself is inserted permanently in the kernel code. It enables the dynamic and reversible loading of services which can be mutually combined (for example a virtualization service and a trace service).

An interest of the new "task_struct" structure is to be able to define, and at any instant identify, a set of tasks (thread ID or process ID), which we aggregate on the "session" concept, and on which it is necessary to act in a consistent and simultaneous manner in order to maintain the coherence of the system.

For example, a number of threads share the same addressable memory space. Loading of a module into one thus affects the others. Similarly, resources such as file descriptors are inherited during the creation of new tasks, and make interdependence relationships appear between the tasks of a single filiation.

The definition of a session s20 consists of assigning a unique session identifier id20 to the initial task 21 of a target application 20 (for example, the launch shell script). This session number will be propagated, by inheritance, and with the aid of hooks, to all the tasks affiliated to this initial task, or for which a new interdependence relationship appears (e.g.: transmission of a file descriptor between 2 non-affiliated processes).

Isolation of Virtualized Sessions

If the process-ids (PID) are considered, each task has a dual identity: its global PID at system level, and its virtual PID, allotted by the virtualization mechanism.

A task forming part of the global space is not virtualized. It can interact with a task only by its global, and not virtual, identifiers. This constitutes a restriction, and prevents the use of monitoring or debugging programs.

We therefore introduce the notion of a session spectator process: the process has access to the virtualization functions of a session, but is not part of the session in case of a checkpoint. The communication channels established with the session tasks are ephemeral. The resources relating to the spectator tasks are ignored during the checkpoint and the restart. For this purpose, a "spectator" flag is introduced into the "task_struct" structure 210 describing the task at system level.

Although all tasks belonging normally to a session are started by a task forming part of the hierarchy of the session tasks, a spectator task originates from the global space and is inserted into the session during its start-up.

An example of the use of a spectator task is the implementation of a debugger that, on its launching, hot-attach itself to a multi-thread virtualized program. The debugger must find the list of all the threads to which it must attach itself, starting from the TID of the target thread, which will be possible only if the debugger is itself virtualized. Another example is a supervision program which must interact with a virtualized application by means of signals. The supervision program monitoring the local system resources has no reason to be migrated, but it does need virtualization in order to interact with the application in a consistent manner.

Synchronization Barrier

This section provides a detailed description of the functioning of the synchronization barrier of the processes, enabling the implementation of the holistic checkpoint.

Difficulties and objectives:

to guarantee the possibility of blocking all the processes forming part of the application to be checkpointed, whatever the workload of the machine or the state or the degree of priority of these processes.

to reliably obtain the complete list of the processes and threads to be blocked, knowing that this list can be constantly modified, due to the sudden appearance or disappearance of processes outside the control of the checkpointing system.

to minimize blocking time, as well as the additional performance cost incurred, inter alia by the addition of the context switching.

In order to guarantee complete identification of the tasks (processes and threads) forming part of a session, we proceed by propagation of a session marker in a field 211 added in the task descriptor 210 (internal structure of the kernel describing a task). This propagation is activated by triggering a specific module each time that the routine for allocation or release of a unique process (PID), thread (TID), or group (GID) identifier is invoked. These routines have been instrumented by hooks, as described previously.

Whenever a new task is spawned, a virtualization module is called by the hook included in the involved system routine.

The virtualization module, when invoked by the hook, examines whether the parent process is itself part of a session. If this is the case, it propagates the session number in the context of the current process. A cross-reference is established in a table of the synchronization module. This enable to guarantee complete identification on the fly of the tasks forming part of the application.

Figure 2:
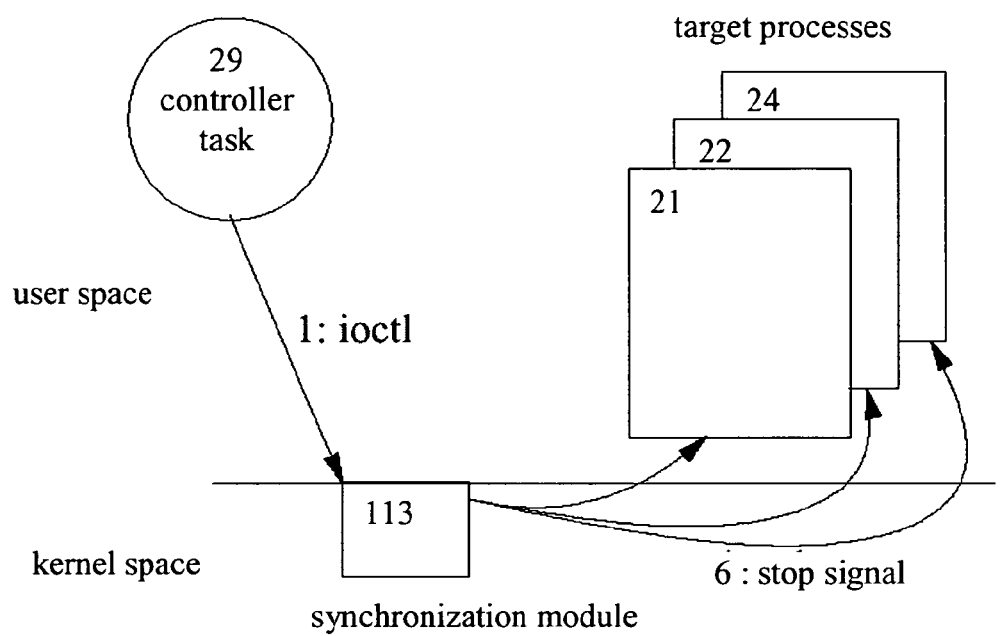
FIG. 2A illustrates use of hooking mechanism for synchronization when checkpointing.
FIG. 2B illustrates structure of inserted code in bootstrap according to the invention.
Figure 2B:
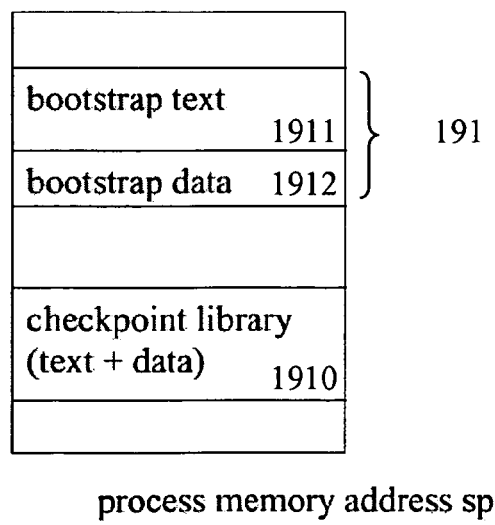

As illustrated in FIG. 2, the synchronization itself is carried out by a synchronization module 113 in kernel mode, which guarantees the capacity to interrupt the executed tasks 21, 22 and 24, whatever their state, as well as the atomicity of the operation. The blocking of the processes is carried out by sending the STOP signal to each of the tasks in an atomic manner. The atomicity is guaranteed by the non-preemptivity of processing in the kernel, as a STOP signal cannot be blocked at user level (in Linux). The list of tasks to be stopped is obtained from the session number.

In the start phase of the synchronisation operation, the synchronization module 113 sends a STOP signal to each task of the session (or virtualized container). No task creation is allowed until the synchronization operation stops. If a task exits during the synchronization, it will be removed from the synchronization barrier array.

It can also be noted that, during this synchronization phase, the possibility of modifying the list of tasks, by adding or deleting processes, is deactivated at the level of the hooks, by testing a variable set by the synchronization module.

The signal handler, similarly installed by the synchronization module 113 in the user context of the processes, can carry out the final rendez-vous phase, by waiting for an event from the synchronization module, which will be sent when the signal has been delivered to all the tasks.

Signal Checkpointing

In order to allow the inclusion of signals sent and used by the virtualized tasks, to carry out the capture of their state as well as their restoration, the following operations must be done:

Virtualize the addressee of the signal.

Virtualize the sender of the signal. Problem, the information is not a parameter or a system call return value, but a field of a structure internal to the kernel and which is sent to the process at the time of processing the signal.

Virtualize the data associated with the signal. Here again, this involves fields in the internal structures of the kernel, over which the user has no control.

At the time of the checkpoint: capture the state of the signals sent to the current process, and not yet used, in a non-destructive manner, and enable the process to use the signals after the checkpoint. Ita est: the checkpoint must preserve the "inflight signals"

For the restoration: generate the internal data relating to the signal, i.e. the inflight signals must be restored.

The mechanism for virtualization of the PIDs by hooks is at a sufficiently low level to enable taking into account the process identifiers manipulated by the signals processing operations.

A supplementary kernel service is introduced, enabling signal generation with fine control by the user of the fields normally restricted to kernel internal use. Although the only information accessible to the user for the transmission of a signal is the number of the latter, the generation service enables to specify each of the attributes defined by the "SIG_INFO" structure.

This service is used on the one hand when checkpointing, in order to restore before resume the signals received by the task but not yet used (assuming that the task continues its running after the checkpoint), and on the other hand during the restart from a checkpoint, in order to regenerate these same signals.

Pseudo Filesystems Virtualization

Under Linux, and other Unix systems, /proc is a pseudo-file system used as interface for access to the system's internal data, rather than having to access directly to the memory image of the kernel (/dev/kmem). The first directory level under /proc is constituted by all the system's visible process identifiers. These identifiers must be virtualized if used by an application which is itself virtualized.

The proposed virtualization mechanism involves the routine for resolution of filenames (name lookup) as file object (inode), for which a specific instance is defined for the pseudo filesystem. When a lookup operation is carried out (i.e. for any operation of manipulating a file by its name), and that the canonical name contains "/proc", then the operations of translation between virtual PID and global system PID (and vice versa) are activated for the tasks forming part of a session, either as an active task or as a spectator task.

File Descriptors Checkpointing

File descriptors are kernel objects which offer a generic abstraction layer of input/output type for system resources, in order to enable their manipulation by the processes.

Figure 3:
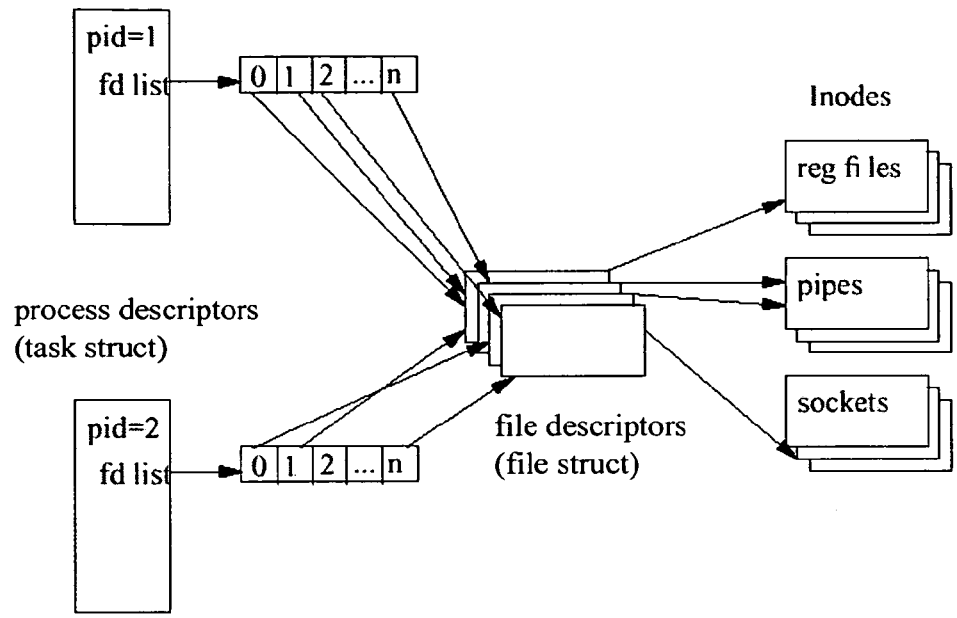
FIG. 3 illustrates internal architecture of file descriptors.

As illustrated in FIG. 3, a file descriptor allows a process to carry out in a uniform manner input-output operations (read-write) to storage files, as well as with various device managers, network connections, or inter-process communication mechanisms (pipes, Unix sockets, streams, etc.).

Whatever the type of system resource, file descriptors have generic properties:

Several descriptors can be opened on a single physical resource (when the latter allows it: i.e. yes for a file, but may be not for a network connection). The changing of an attribute of the descriptor does not affect other descriptors pointing on to the same resource.

An open file descriptor can be "cloned" ("dup" system call). As a result, several instances of a single descriptor are obtained, each with its own identity (descriptor number). The changing of certain attributes of a descriptor (e.g.: read-write pointer in a file), is completely reflected in its clones.

The file descriptors opened by a parent process are inherited (through cloning) by a child process during creation of the latter ("fork" system call). The parent can also specify in advance the list of descriptors to be closed when the child executes a new program ("execve" system call).

A file descriptor can be sent by one process to another ("sendmsg" system call), without any hierarchical parentship link existing between these processes.

However, it transpires that the operating system does not offer a means of determining, a posteriori, for the file descriptors referenced by a set of processes, which have been inherited or cloned, and which have been opened separately.

A mechanism is therefore introduced enabling:

Identification of the attributes internal to file descriptors made opaque by the operating system.

Capture of the state of these attributes in the checkpoint.

Restoration of the state of these attributes on restarting the application.

Figure 4:
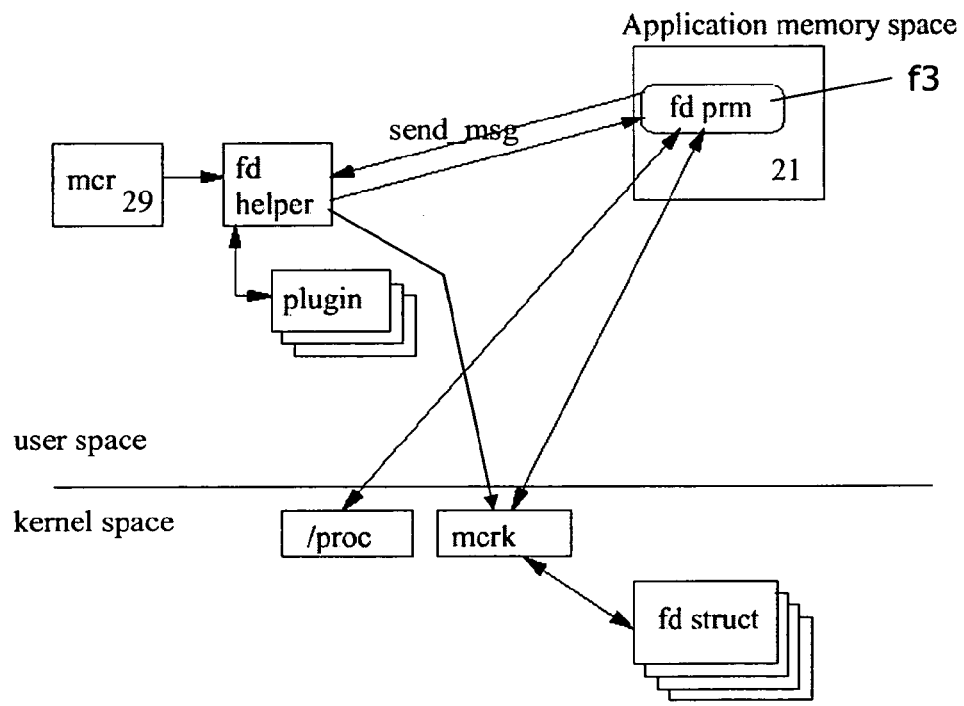
FIG. 4 illustrate an architecture using an inserted code for exploring the content of the file descriptors of open processes.

FIG. 4 shows the architecture for processing the file descriptors at the time of the checkpoint and the restart.

At the checkpoint, the following operations are carried out:

the checkpoint controller process, called "mcr" start a process called "fd_helper" in the user memory space, for taking into account file descriptors of the managed processes, for example the process of a containerized application.

the "mcr" controller process uses a kernel module "mcrk" for embedding into the application execution, by a bootstrap mechanism as mentioned above, a code module "fd_prm" comprising a checkpoint functions library.

the file descriptors content (fd struct) of opened process is read by the "fd_prm" code, then transmitted by "send_msg" type system call to the "fd_helper", in order to supply it with an access to the opened processes context without closing the resource.

The system described here has as its principal benefit a great portability, despite dependence on data internal to the operating system.

Inter Process Channel Virtualization

This kind of processing is also applied to the following methods of inter-process communication:

"pipes" (or "fifo")

"sockets" (mainly "socketpairs").

"message queues"

"streams"

As for pending signals (received but not used), the inter-process communication channel data can reside in receipt memory buffers (buffers) at the time of the checkpoint.

The checkpoint mechanism for this data then consists of using this data during the checkpoint phase, in order to back it up, then to reinject this data just before the restart, either because the task resumes its running after checkpointing, or because it involves restarting the task from a checkpoint. This work is performed by the "fd_helper" module. If there is multiple file descriptors pointing to the same channel, it is thus possible to perform the operation only once.

The mechanism of capturing the data is driven by task on the receive side of the channel. If there are several processes in reception on a single file descriptor, only one process carries out the backup (and then the reinjection), using the "fd_helper" mechanism described earlier.

It can also be that at the time of the checkpoint, the inter-process communication channel is in a transitory state. For example, the sending process can have finished already and have disappeared although the receptor has not yet used all the data. After backing up the data at the receptor level, the channel state has to be restored, and for this recreate and simulate the death of the sender, which is done by the "fd_helper".

In the case where this involves a receptor which has disappeared before using the channel data, it is not necessary to carry out the backup and restoration of the data if the channel is no longer accessible by a new task (case of socketpairs, or unnamed pipes).

If, on the other hand, the channel is accessible in reception by a future task (case of named pipes or sockets), the sending task then drives the fd_helper to carry out the backup and restoration of this data.

The distinction between these different cases is made using fd_helper, which establishes the graph of dependencies of each of the inter-process communication channels.

The inter-process communication system based on sockets uses a connection establishing mechanism like "bind, listen, accept", which uses global resources, which prevents an application, virtualized or not, from using an address (or pipe name) if the latter is already used.

In order to overcome this limitation, the global resources linked to the inter-process communications, such as the socket addresses for the Unix domain, or file names of the pipe type, or yet again socket addresses on a loopback interface, are virtualized in order to enable an isolation of the naming spaces per session.

The separation of the naming space for pipe names or Unix socket addresses is done by adding a root containing the unique session number, prefixing in a transparent manner the name allocated by the application.

For example, a pipe named by the application "/tmp/pipe1" will be named at the system level "/proc/mcr/123/paths/tmp/pipe1" (123 being the unique session number).

Of course, the invention is not limited to the examples which have just been described and numerous modifications can be applied to these examples without exceeding the scope of the invention.

The invention claimed is:

1. A method for dynamic insertion of one or more program instructions by a first computer task, termed manager task, in a second computer task, termed target task, executed in a memory address space managed by a system software in a computer system, comprising:
   storing, within a memory area outside the memory address space of the target task, of at least one hooking datum representing initiation data for the code to be inserted;
   executing, within the execution of a system routine called or controlled by the target task, an instruction termed hooking which initiates a test of the hooking datum;
   executing the inserted code, according to the result of said test and instead of the program instruction following the hooking instruction in the execution of said system routine;
   wherein the target task is linked to a third task belonging to a same session of a target application by the sharing of a single execution memory space and represented by a common virtual container identifier, and
   wherein the target task and the linked third task are temporarily blocked from execution during the loading, into said single execution memory space, of the code to be inserted by sending a STOP signal to the target task and the linked third task.

2. The method of claim 1, further comprising, on completion executing the inserted code, resuming the execution of the system routine with the program instruction immediately following the hooking instruction.

3. The method of claim 1 wherein the inserted code comprises managing at least one datum identifying the target task.

4. The method of claim 1 wherein the inserted code implements or triggers at least one functioning management operation of an application termed managed application.

5. The method of claim 4, wherein the functioning management operation comprises at least one operation of monitoring or recording the execution of the target task, or capturing the state of said target task or at least one resource which it uses.

6. The method of claim 4, wherein the functioning management operation comprises at least one operation for storing a datum associated with the target task and representing a synchronisation barrier with at least one other task.

7. The method of claim 4, wherein the functioning management operation comprises at least one operation of replication of the target task into another computer system, or releasing said target task or at least one resource which uses its resources, in its original system, after such a replication.

8. The method of claim 1 wherein the inserted code produces a dynamic loading of an element of a software library, said software library being accessible or editable during the execution of the target task or of an application to which it belongs.

9. The method of claim 1 wherein the inserted code comprises storing in an associated fashion with the target task a datum constituting the common virtual container identifier between the target task in an application and at least one other running task in the application, thus constituting an identifier of a virtual container encompassing said tasks.

10. The method of claim 9 wherein the virtual container identifier is stored in a manner associated with a first task, this virtual container identifier being propagated to at least one second task by inheritance from the first task.

11. The method of claim 9 wherein at least the third task is created by an operation comprising a hooking instruction used by a manager task in order to store with said third task a virtual container identifier corresponding to an existing virtual container and which must contain said third task.

12. The method of claim 9 wherein at least one software operation is applied to all the tasks belonging to a single virtual container.

13. The method of claim 9 wherein the virtual container combines a set of tasks executed within a single application termed target application.

14. The method of claim 9 wherein at least one task executed in the computer system undergoes a functioning management operation depending on its belonging to the virtual container.

15. The method of claim 14 wherein the functional management of the container tasks comprises a monitoring or checking of the execution, or capture of the state, of at least one computer task or at least one resource which it uses.

16. The method of claim 14 wherein the functioning management of the container tasks comprises replicating at least one computer task into another computer system, or releasing this task or at least one resource which it uses, after such a replication.

* * * * *